(12) United States Patent
Sasaki et al.

(10) Patent No.: US 11,059,376 B2
(45) Date of Patent: Jul. 13, 2021

(54) VEHICLE

(71) Applicant: Toyota Jidosha Kabushiki Kaisha, Toyota (JP)

(72) Inventors: Masaru Sasaki, Toyota (JP); Hironobu Hashimoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 42 days.

(21) Appl. No.: 16/708,932

(22) Filed: Dec. 10, 2019

(65) Prior Publication Data

US 2020/0207226 A1 Jul. 2, 2020

(30) Foreign Application Priority Data

Dec. 28, 2018 (JP) .............................. JP2018-247262

(51) Int. Cl.
*B60L 53/16* (2019.01)
*B62D 25/02* (2006.01)
*E05B 83/34* (2014.01)

(52) U.S. Cl.
CPC .............. *B60L 53/16* (2019.02); *B62D 25/02* (2013.01); *E05B 83/34* (2013.01)

(58) Field of Classification Search
CPC .......... B60L 53/16; B60L 53/14; B60L 53/18; E05B 83/34; B62D 25/02; B60K 15/05; B60K 2015/053; B60K 15/04; Y02T 90/14; Y02T 10/7072; Y02T 10/70; H01R 13/633; H01R 2201/26

USPC ...................................................... 296/193.05
See application file for complete search history.

(56) References Cited

U.S. PATENT DOCUMENTS

| 6,624,610 B1 * | 9/2003 | Ono .......................... B62J 11/00 |
| | | 320/104 |
| 2011/0241360 A1 | 10/2011 | Kitamura |
| 2012/0083148 A1 * | 4/2012 | Hirashita ............. H01R 13/639 |
| | | 439/304 |
| 2013/0152474 A1 * | 6/2013 | Yamamaru .............. B60L 53/16 |
| | | 49/246 |
| 2014/0170889 A1 | 6/2014 | Kahara et al. |
| 2016/0280086 A1 * | 9/2016 | Lopez ..................... B60L 53/16 |

FOREIGN PATENT DOCUMENTS

| JP | 2011-214242 A | 10/2011 |
| JP | 2014-118693 A | 6/2014 |
| JP | 2017-212133 A | 11/2017 |

* cited by examiner

*Primary Examiner* — Pinel E Romain
(74) *Attorney, Agent, or Firm* — Dinsmore & Shohl LLP

(57) ABSTRACT

A vehicle includes: an inner panel; a side surface portion that defines a vehicle cabin; and a lock release mechanism disposed outside the vehicle cabin with the inner panel interposed between the lock release mechanism and the vehicle cabin, the lock release mechanism configured to release locking of a lock device provided at a charging port. The side surface portion has an opening, the inner panel has a hole, and the lock release mechanism is provided so as to be operable from an interior of the vehicle cabin through the opening and the hole.

5 Claims, 5 Drawing Sheets

VEHICLE

CROSS-REFERENCE TO RELATED APPLICATIONS

This application claims priority to Japanese Patent Application No. 2018-247262 filed on Dec. 28, 2018, which is incorporated herein by reference in its entirety including the specification, drawings and abstract.

BACKGROUND

1. Technical Field

The disclosure relates to a vehicle including a lock release mechanism that can release locking of a lock device provided at a charging port.

2. Description of Related Art

There has been proposed an emergency lock release device that can operate a charging cable lock device, which locks a charging cable connected to an inlet, by manual operation of a release lever in an unlocking direction (see, for example, Japanese Unexamined Patent Application Publication No. 2017-212133 (JP 2017-212133 A)). In the emergency lock release device, an engagement portion of a wire-shaped release operation portion on its distal end side is engaged with the release lever, and a grip portion of the release operation portion on its base end side is led into an accommodating portion that is opened and closed by a trim cover inside a vehicle. An operator can operate the release lever in the unlocking direction by pulling the grip portion of the release operation portion, thereby forcibly releasing locking of the charging cable lock device.

SUMMARY

Consider a case where a lock release mechanism is disposed outside the vehicle cabin with an inner panel interposed between the lock release mechanism and the vehicle cabin and an opening is provided in the vehicle cabin, through which the lock release mechanism is accessed. Since the inner panel of the vehicle has a complicated shape due to various restrictions, a path from the opening in the vehicle cabin to the lock release mechanism is complicated, so that access from the vehicle cabin to the lock release mechanism is difficult. When one end of the wire (release operation portion) is engaged with the lock release mechanism and the other end of the wire is led into the vehicle cabin in order to access the lock release mechanism with the wire, as described in JP 2017-212133 A, the path from the opening in the vehicle cabin to the lock release mechanism is complicated, so that the assembling property of the wire is deteriorated.

According to the disclosure, in a lock release mechanism disposed outside a vehicle cabin with an inner panel interposed the lock release mechanism and the vehicle cabin, it is possible to further improve accessibility when the lock release mechanism is operated from the vehicle cabin.

An aspect of the disclosure relates to a vehicle. The vehicle includes an inner panel, a side surface portion that defines a vehicle cabin, and a lock release mechanism disposed outside the vehicle cabin with the inner panel interposed between the lock release mechanism and the vehicle cabin. The lock release mechanism is configured to release locking of a lock device provided at a charging port. The side surface portion has an opening. The inner panel has a hole. The lock release mechanism is provided so as to be operable from an interior of the vehicle cabin through the opening and the hole.

With the above configuration, it is possible to further improve accessibility to the lock release mechanism from the interior of the vehicle cabin at the time of operating the lock release mechanism.

In the vehicle, the lock release mechanism may be provided on a straight line connecting the opening and the hole. With the above configuration, a path from the opening in the vehicle cabin to the lock release mechanism can be formed straight. Therefore, it is possible to further improve the accessibility to the lock release mechanism.

In the vehicle, the lock release mechanism may be provided so as to be operable by passing a tool through the opening and the hole.

In the vehicle, the lock release mechanism is provided on a straight line connecting the opening and the hole, and the lock release mechanism may be provided so as to be operable by passing a tool having a rod shape through the opening and the hole. With the above configuration, the lock release mechanism can be operated simply by inserting a tool having a rod shape into the opening and pushing in the tool in a direction in which the tool extends.

In the vehicle, the lock device may be a charging connector locking device that locks, to an inlet, the charging connector connected to the inlet. The inlet may be provided at the charging port.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Next, a mode for carrying out the disclosure will be described using an embodiment.

Figure 1:
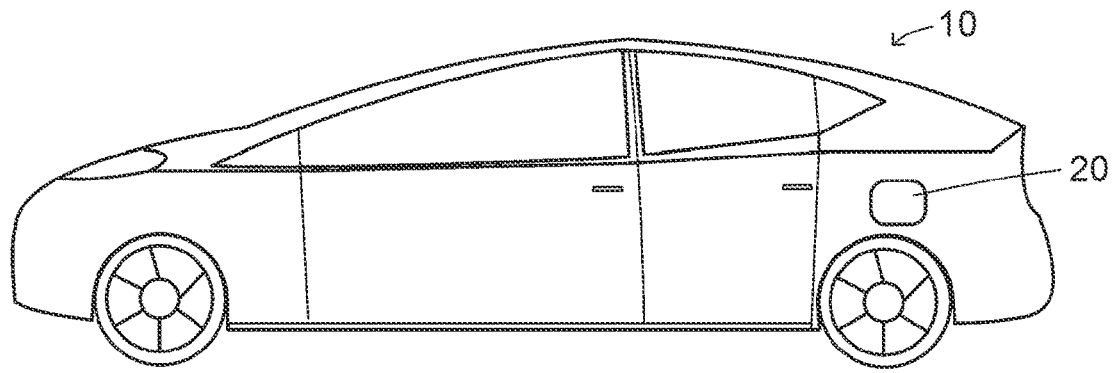
FIG. 1 is an external view showing an external appearance of a vehicle 10 that is an embodiment of the disclosure.
Figure 2:
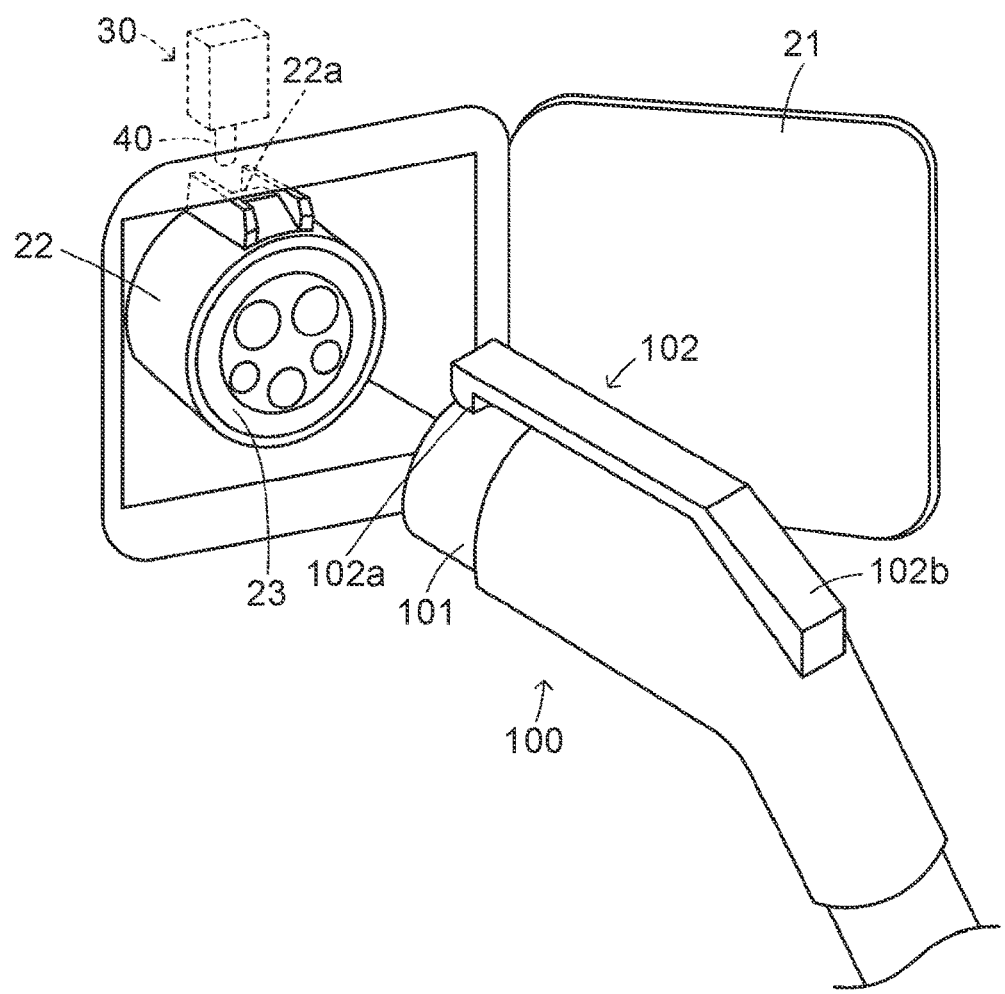
FIG. 2 is a drawing illustrating a schematic configuration of a vehicle inlet device 20 and a charging connector 100.
Figure 3:
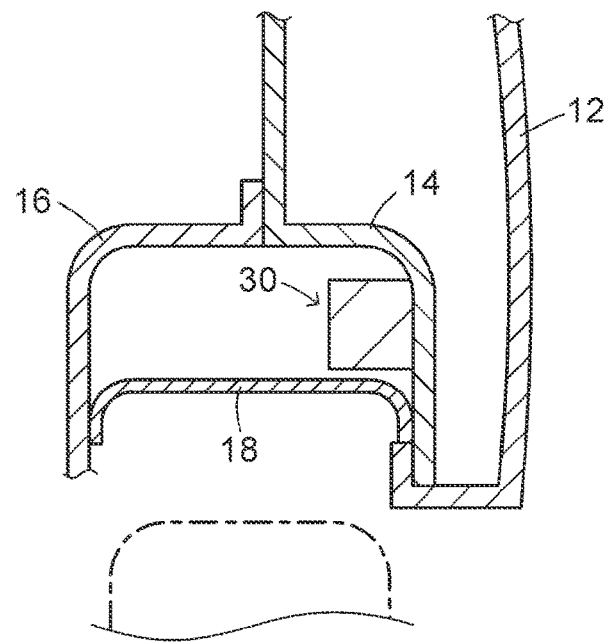
FIG. 3 is a drawing illustrating an arrangement of a charging connector locking device 30.
Figure 4:
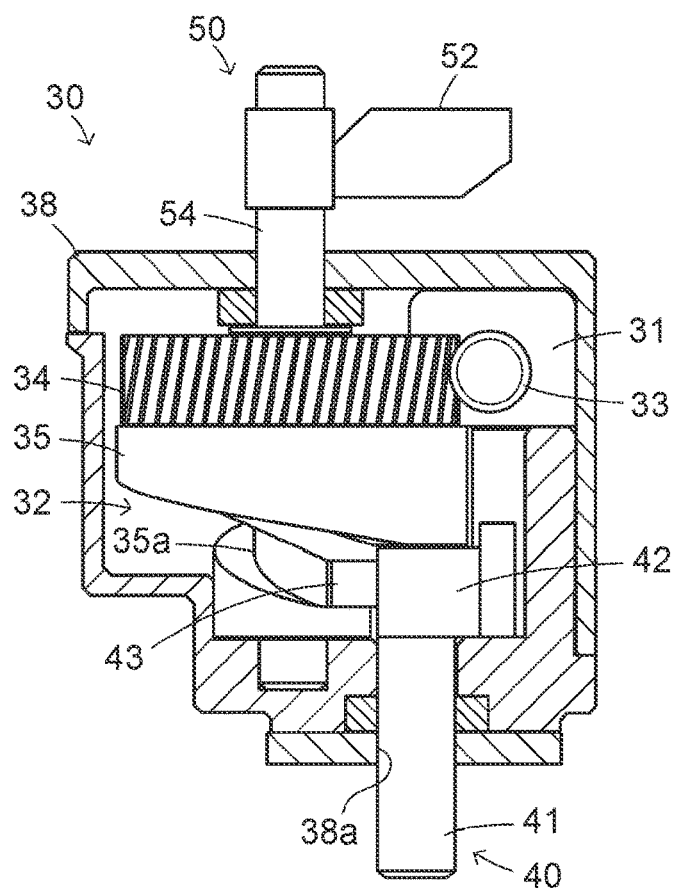
FIG. 4 is a drawing illustrating a schematic configuration of the charging connector locking device 30.
Figure 5:
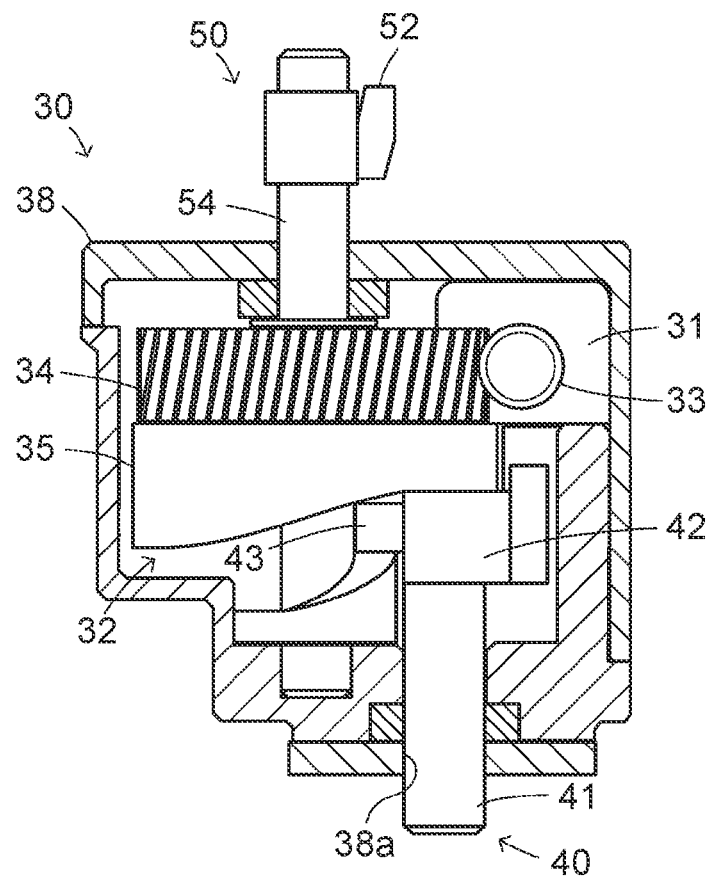
FIG. 5 is a drawing illustrating the schematic configuration of the charging connector locking device 30.

FIG. 1 is an external view showing an external appearance of a vehicle 10 that is an embodiment of the disclosure. FIG. 2 is a drawing illustrating a schematic configuration of a vehicle inlet device 20 and a charging connector 100. FIG. 3 is a drawing illustrating an arrangement of a charging connector locking device 30. FIGS. 4 and 5 are drawings each illustrating a schematic configuration of the charging connector locking device 30.

As shown in FIG. 1, the vehicle inlet device 20 is provided at a charging port formed in a rear side face of the vehicle 10. A charging connector connected to a charging facility via a charging cable is connected to the vehicle inlet device 20 so that a battery of the vehicle 10 is charged with electric power from the charging facility. The vehicle 10 is configured as an electric vehicle or a hybrid vehicle equipped with a motor for traveling and a battery that supplies power to the motor.

As shown in FIG. 2, the vehicle inlet device 20 includes a charging lid 21 that opens and closes the charging port, a charging inlet 22 to which a charging connector 100 connected to the charging facility via the charging cable is connected, and a charging connector locking device 30 that locks, to the charging inlet 22, the charging connector 100 connected to the charging inlet 22.

A cylindrical insertion-side connection port 101 is provided at a front end of the charging connector 100. By inserting the insertion-side connection port 101 of the charging connector 100 into a reception-side connection port 23 of the charging inlet 22, terminals inside the charging connector 100 and terminals inside charging inlet 22 are electrically connected to each other.

An upper surface of the charging connector 100 is provided with a lock arm 102 for restraining the charging connector 100 from coming off the charging inlet 22 when the charging connector 100 is inserted into the charging inlet 22. A central portion of the lock arm 102 has a swing shaft (not shown) that extends in a direction orthogonal to a longitudinal direction of the lock arm 102. The lock arm 102 is configured to be swingable about the swing shaft. A torsion spring that biases the lock arm 102 to one side in a swinging direction is provided on the swing shaft of the lock arm 102. An engaging claw 102a that protrudes downward is provided at a distal end of the lock arm 102, and an operation portion 102b that is pressed by an operator is provided at a proximal end of the lock arm 102. When the insertion-side connection port 101 of the charging connector 100 is inserted into the reception-side connection port 23 of the charging inlet 22, the engaging claw 102a of the lock arm 102 is engaged with an engaging recess 22a provided at the top of the charging inlet 22. Thus, the lock arm 102 restrains the charging connector 100 from coming off the charging inlet 22. The lock arm 102 releases the retaining of the charging connector 100 with respect to the charging inlet 22 when the operation portion 102b is pressed against the biasing force of the torsion spring.

The charging connector locking device 30 is a device for locking the charging connector 100 to the charging inlet 22. In the embodiment, as shown in FIG. 3, the charging connector locking device 30 is disposed in a space defined by a wheelhouse outer panel 14, a wheelhouse inner panel 16, and a wheelhouse cover 18. The wheelhouse outer panel 14 is joined to a rear quarter panel 12 of the vehicle 10. The wheelhouse inner panel 16 is disposed more inward than the wheelhouse outer panel 14 with respect to the vehicle cabin. As shown in FIGS. 4 and 5, the charging connector locking device 30 includes a lock pin 40, a motor 31, a conversion mechanism 32, and a release lever 52. The conversion mechanism 32 converts rotational motion of the motor 31 into vertical motion of the lock pin 40.

The conversion mechanism 32 includes a worm 33 attached to an output shaft of the motor 31, a worm wheel 34 meshed with the worm 33, and a rotating member 35 that rotates coaxially and integrally with the worm wheel 34. A guide groove 35a that is inclined with respect to an axial direction and a circumferential direction of the rotating member 35 is provided on a side surface of the rotating member 35.

As shown in FIGS. 4 and 5, the lock pin 40 includes a shaft portion 41, a head portion 42, and an engaging protrusion 43. The shaft portion 41 passes through an insertion hole 38a formed in a bottom wall of a housing 38 with its distal end portion exposed outside. The head portion 42 is provided at a proximal end portion of the shaft portion 41. The engaging protrusion 43 extends from the head portion 42 in a radial direction (left side in the drawing). The engaging protrusion 43 is engaged with the guide groove 35a of the rotating member 35. When the rotating member 35 is rotated in one direction by the motor 31 with the engaging claw 102a of the lock arm 102 engaged with the engaging recess 22a of the charging inlet 22, the engaging protrusion 43 is pressed down by an upper surface of the guide groove 35a, thereby lowering the lock pin 40. As a result, the distal end portion of the lock pin 40 presses an upper surface of the lock arm 102 such that the engaging claw 102a is pressed against the engaging recess 22a, and the charging connector 100 is locked to the charging inlet 22. Since the lock arm 102 cannot swing with the charging connector 100 in a locked state, the operation portion 102b cannot be pressed, and the charging connector 100 cannot be pulled out from the charging inlet 22. When the rotating member 35 is rotated in the other direction by the motor 31, the engaging protrusion 43 is pushed up by a lower surface of the guide groove 35a, thereby raising the lock pin 40. As a result, the distal end portion of the lock pin 40 is separated away from the lock arm 102. Thus, the operation portion 102b is pressed to separate the engaging claw 102a from the engaging recess 22a, so that the charging connector 100 can be pulled out from the charging inlet 22.

The release lever 52 is used for manually releasing locking of the charging connector locking device 30. The release lever 52 is attached to a shaft 54 coaxially fixed to the worm wheel 34 as shown in FIGS. 4 and 5. In the embodiment, when the release lever 52 is operated from the near side toward the back side in the drawings, the rotating member 35 rotates in the other direction and the lock pin 40 is raised accordingly. Thereby, even when the motor 31 breaks down and the locked state of the charging connector 100 cannot be released by the charging connector locking device 30, the locked state of the charging connector 100 can be forcibly released by manual operation. Here, in the embodiment, the release lever 52 and the shaft 54 correspond to a lock release mechanism 50.

Figure 6:
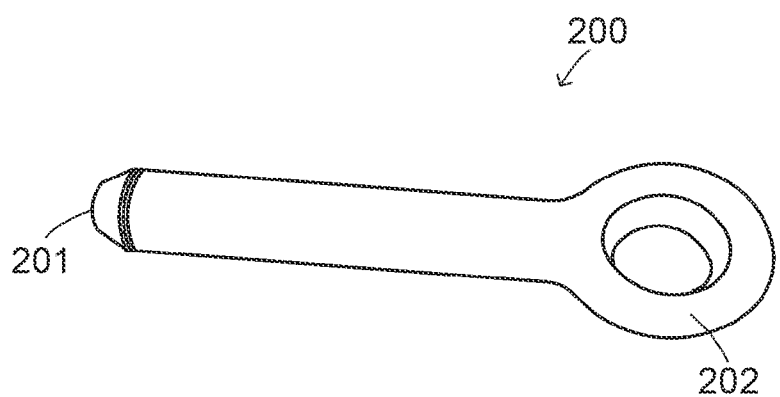
FIG. 6 is an external view showing an external appearance of a tool 200.
Figure 7:
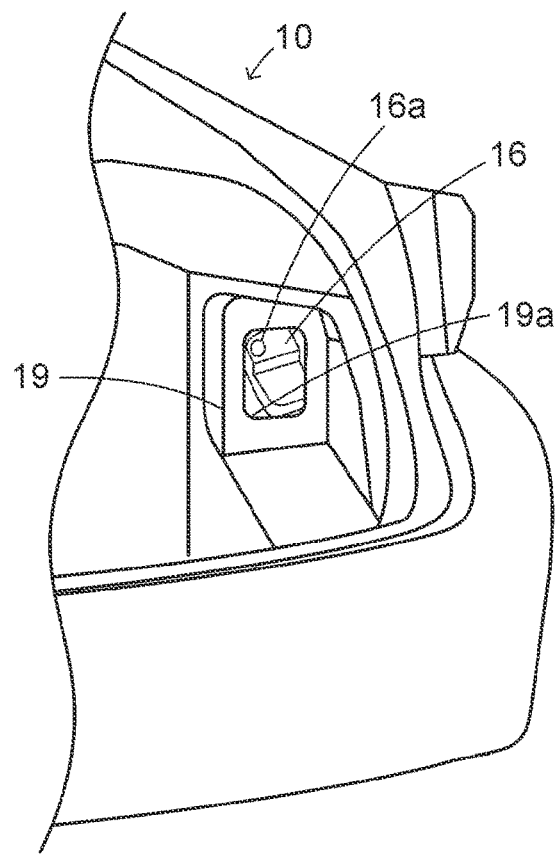
FIG. 7 is a drawing illustrating a schematic configuration of a deck side panel 19 of the vehicle 10.

As shown in FIG. 6, the release lever 52 is operated using a rod-shaped tool 200 having a pressing portion 201 at its distal end and a grip portion 202 at its proximal end. In the embodiment, an insertion port 19a (opening) for the tool 200 is formed on a deck side panel 19 (side surface portion) of a luggage space at the rear of the vehicle, as shown in FIG. 7. Further, the wheelhouse inner panel 16 (inner panel) interposed between the luggage space (vehicle cabin) and the lock release mechanism 50 is provided with an insertion hole 16a into which the tool 200 is inserted. In the embodiment, the insertion hole 16a is formed so as to be positioned on a straight line connecting the insertion port 19a and the release lever 52 of the lock release mechanism 50. The insertion hole 16a is covered with a cap (not shown) that is detachable.

Figure 8:
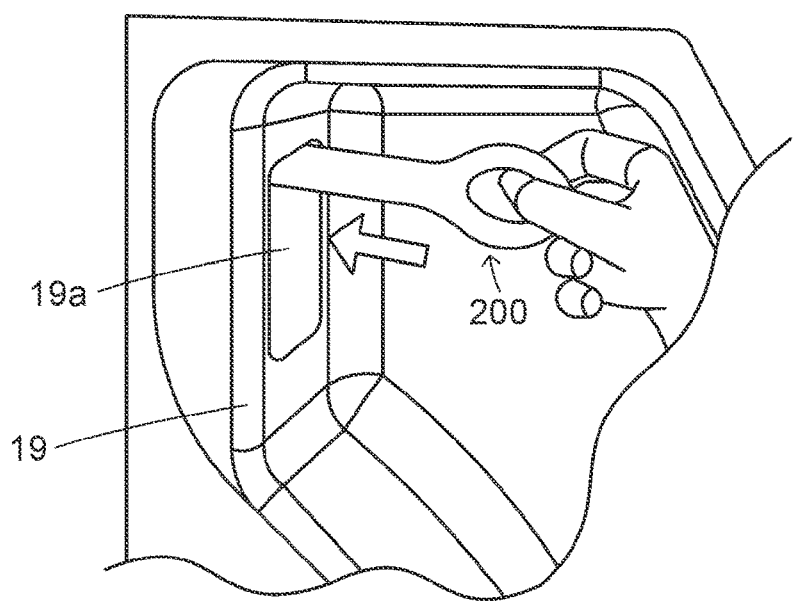
FIG. 8 is a drawing illustrating how locking is released using the tool 200.
Figure 9:
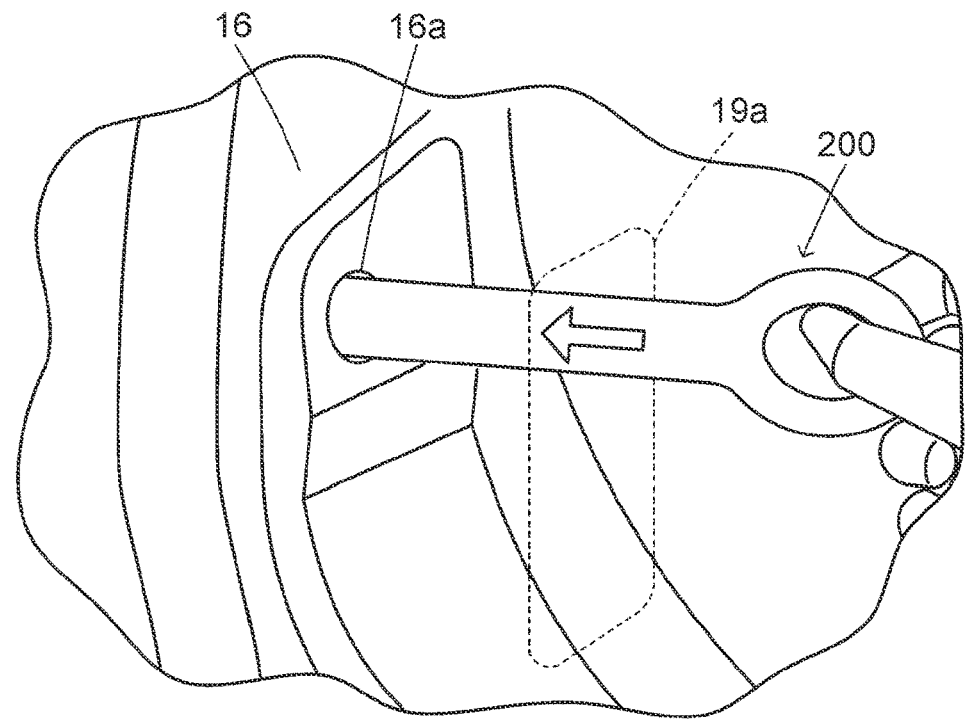
FIG. 9 is a drawing illustrating how locking is released using the tool 200.
Figure 10:
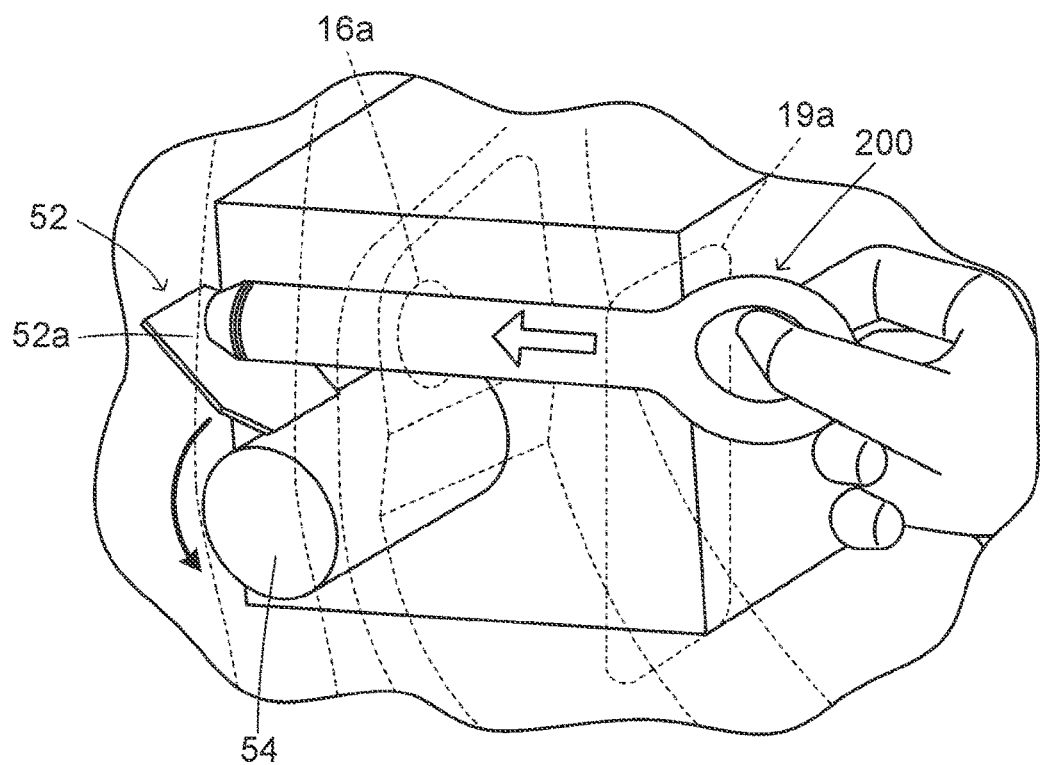
FIG. 10 is a drawing illustrating how locking is released using the tool 200.

The operation of the release lever 52 using the tool 200 is performed by first removing the cap placed on the insertion hole 16a and then holding the grip portion 202 of the tool 200 to insert a tip end portion (pressing portion 201) of the tool 200 into the insertion port 19a formed in the deck side panel 19, as shown in FIG. 8. Subsequently, as shown in FIG. 9, the tool 200 is pushed in a direction in which the tool 200 extends so that the tip end portion of the tool 200 passes through the insertion hole 16a of the wheelhouse inner panel 16. Then, as shown in FIG. 10, the tool 200 is further pushed in such that the tip end portion of the tool 200 passing through the insertion hole 16a abuts against a pressed surface 52a of the release lever 52 and the shaft 54 rotates in an unlocking direction (direction represented by a thick arrow in the drawing), whereby the pressed surface 52a of the release lever 52 is pressed by the pressing portion 201 of the tip end portion. Thus, the locked state of the charging connector 100 can be forcibly released through the operation of the release lever 52.

In the vehicle 10 of the embodiment described above, the lock release mechanism 50 of the charging connector locking device 30 is disposed outside the vehicle cabin with the wheelhouse inner panel 16 (inner panel) interposed between the lock release mechanism 50 and the vehicle cabin. In the vehicle 10, the insertion port 19a (opening) for the tool 200 is provided in the vehicle cabin and the insertion hole 16a (hole) for the tool 200 is provided in the wheelhouse inner panel 16 that is interposed between the insertion port 19a and the lock release mechanism 50. Thereby, the tool 200 can be passed through the insertion port 19a in the vehicle cabin and the insertion hole 16a of the wheelhouse inner panel 16 so as to operate the release lever 52 of the lock release mechanism 50. As a result, it is possible to further improve the accessibility when the lock release mechanism 50 is operated from the vehicle cabin.

Further, in the vehicle 10 of the embodiment, the insertion hole 16a (hole) of the wheelhouse inner panel 16 is provided on the straight line connecting the insertion port 19a (opening) in the vehicle cabin and the release lever 52 of the lock release mechanism 50. Thereby, the accessibility to the lock release mechanism 50 can be further improved. Moreover, since the rod-shaped tool is used as the tool 200, the accessibility to the lock release mechanism 50 can be further improved.

In the embodiment, the lock release mechanism 50 is operated by passing the tool 200 through the insertion port 19a (opening) in the vehicle cabin and the insertion hole 16a (hole) of the wheelhouse inner panel 16 (inner panel) and abutting the tool 200 against the release lever 52. However, depending on the sizes of the opening and the hole or the distance from the opening to the lock release mechanism, the lock release mechanism may be operated directly by extending the hand without using a tool.

In the embodiment, the insertion hole 16a (hole) of the wheelhouse inner panel 16 (inner panel) is provided on the straight line connecting the insertion port 19a (opening) and the release lever 52 of the lock release mechanism 50. However, the hole may be provided at a position slightly offset from the straight line connecting the opening and the lock release mechanism.

In the embodiment, the disclosure is applied to a vehicle in which the locking of the charging connector locking device 30 that locks, to the charging inlet 22, the charging connector 100 connected to the charging inlet 22 is released. However, the disclosure is not limited to this. For example, the disclosure may be applied to a vehicle in which locking of a charging lid locking device is released, which locks the charging lid 21 in a closed state.

The correspondence between the main elements of the embodiment and the main elements of the disclosure described in the summary of the disclosure will be described. In the embodiment, the wheelhouse inner panel 16 is an example of the "inner panel", the charging connector locking device 30 is an example of the "lock device", the lock release mechanism 50 is an example of the "lock release mechanism", the insertion port 19a formed in the deck side panel 19 is an example of the "opening", and the insertion hole 16a formed in the wheelhouse inner panel 16 is an example of the "hole".

The correspondence between the main elements of the embodiment and the main elements of the disclosure described in the summary of the disclosure does not limit the elements of the disclosure described in the summary of the disclosure, because the embodiment is merely an example for specifically describing the mode for carrying out the disclosure described in the summary of the disclosure. That is, the interpretation of the disclosure described in the summary of the disclosure should be made based on the description therein, and the embodiment is merely a specific example of the disclosure described in the summary of the disclosure.

Although the mode for carrying out the disclosure has been described using the embodiment, the disclosure is not limited to the embodiment, and may be carried out in various modes without departing from the scope of the disclosure.

The disclosure can be used in the industry of manufacturing vehicle connector lock release mechanisms.

What is claimed is:
1. A vehicle comprising:
an inner panel;
a side surface portion that defines a vehicle cabin; and
a lock release mechanism disposed outside the vehicle cabin with the inner panel interposed between the lock release mechanism and the vehicle cabin, the lock release mechanism configured to release locking of a lock device provided at a charging port, wherein:
the side surface portion has an opening;
the inner panel has a hole; and
the lock release mechanism is provided so as to be operable from an interior of the vehicle cabin through the opening and the hole.
2. The vehicle according to claim 1, wherein the lock release mechanism is provided on a straight line connecting the opening and the hole.
3. The vehicle according to claim 1, wherein the lock release mechanism is provided so as to be operable by passing a tool through the opening and the hole.
4. The vehicle according to claim 1, wherein:
the lock release mechanism is provided on a straight line connecting the opening and the hole; and
the lock release mechanism is provided so as to be operable by passing a tool having a rod shape through the opening and the hole.
5. The vehicle according to claim 1, wherein:
the lock device is a charging connector locking device that locks, to an inlet, a charging connector connected to the inlet; and
the inlet is provided at the charging port.

* * * * *